United States Patent
Canova, Jr.

(10) Patent No.: US 8,456,428 B2
(45) Date of Patent: Jun. 4, 2013

(54) USER INTERFACE FOR MOBILE COMPUTING DEVICE

(75) Inventor: Francis J. Canova, Jr., Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 851 days.

(21) Appl. No.: 12/467,067

(22) Filed: May 15, 2009

(65) Prior Publication Data

US 2009/0225056 A1 Sep. 10, 2009

Related U.S. Application Data

(63) Continuation of application No. 10/054,684, filed on Jan. 22, 2002, now abandoned.

(51) Int. Cl.
*G09G 5/00* (2006.01)

(52) U.S. Cl.
USPC ........ 345/173; 178/18.01; 715/780; 715/808; 345/184

(58) Field of Classification Search
USPC .................. 345/156–179; 715/764, 780, 781, 715/864, 783–809; 178/18.01–18.11, 19.01–19.07; 455/418–420, 899, FOR. 121; 463/37, 38
See application file for complete search history.

(56) References Cited

U.S. PATENT DOCUMENTS

| | | | |
|---|---|---|---|
| 5,006,836 A | 4/1991 | Cooper | |
| 5,023,851 A * | 6/1991 | Murray et al. | 368/41 |
| 5,122,785 A | 6/1992 | Cooper | |
| 5,237,327 A | 8/1993 | Saitoh et al. | |
| 5,544,285 A | 8/1996 | Glaser et al. | |
| 5,581,243 A * | 12/1996 | Ouellette et al. | 345/173 |
| 5,805,474 A | 9/1998 | Danielson et al. | |
| 5,881,169 A | 3/1999 | Henry, Jr. | |
| 5,889,506 A | 3/1999 | Lopresti et al. | |
| 5,923,327 A | 7/1999 | Smith et al. | |
| 6,078,313 A * | 6/2000 | Sezaki et al. | 345/168 |
| 6,091,415 A * | 7/2000 | Chang et al. | 715/809 |
| 6,130,665 A * | 10/2000 | Ericsson | 345/173 |
| D453,148 S | 1/2002 | Alexander et al. | |
| 6,392,640 B1 * | 5/2002 | Will | 345/184 |
| 6,441,805 B1 | 8/2002 | Reid et al. | |
| 6,535,749 B1 * | 3/2003 | Iwata et al. | 455/556.2 |
| 6,559,831 B1 | 5/2003 | Armstrong | |
| 2002/0030668 A1* | 3/2002 | Hoshino et al. | 345/175 |
| 2003/0001899 A1* | 1/2003 | Partanen et al. | 345/800 |
| 2003/0007018 A1* | 1/2003 | Seni et al. | 345/864 |
| 2003/0076302 A1* | 4/2003 | Langstraat | 345/161 |
| 2003/0122882 A1 | 7/2003 | Kho | |

OTHER PUBLICATIONS

Handera 330 Features, printed from website http://www.handera.com/products/333feat.asp on Jul. 10, 2001, 3 pp.

* cited by examiner

*Primary Examiner* — Tom Sheng

(57) ABSTRACT

A mobile computing device includes a housing, a touch screen display coupled to the housing, a processor coupled to the touch screen display, and a user input device responsive to a sliding manipulation by a user. The processor may be configured to activate a keyboard entry area on the touch screen display responsive to the sliding manipulation. The mobile computing device may include a cellular phone.

17 Claims, 4 Drawing Sheets

USER INTERFACE FOR MOBILE COMPUTING DEVICE

CROSS-REFERENCE TO RELATED APPLICATIONS

The present application is a continuation of U.S. application Ser. No. 10/054,684, filed Jan. 22, 2002, which is incorporated by reference herein in its entirety.

BACKGROUND

Handheld computing devices, "palmtops," "palmhelds," personal digital assistants (PDAs), or handheld computers typically weigh less than a pound and fit in a pocket. These handhelds generally provide some combination of personal information management, database functions, word processing, and spreadsheets as well as voice memo recording, wireless e-mail, and wireless telephony functions. Because of the small size and portability of handhelds, strict adherence to hardware constraints such as memory and processor size must be maintained.

Conventional handheld computing devices can include a display and screen or touch screen. The display is provided behind the touch screen. A portion of the display can be dedicated for an entry area or user interface which allows a user to input text to the handheld computing device. For example, various conventional handheld computing devices manufactured by Palm, Inc. include a graffiti pad in a fixed location on its touch screen. The graffiti pad can include an area for providing letters (text) and an area for providing numbers (text) and can further include handwriting recognition software to interpret the user inputs. For example, the Palm® III device and Palm® V device include a graffiti pad fixed to a bottom quarter of the display. Letters and numbers can be input using a stylus or finger. The fixed graffiti area requires space on the display and touch pad. Further, the fixed graffiti area cannot be enlarged if necessary.

In addition, conventional handheld computing devices manufactured by Palm, Inc. include a keyboard interface duplicating a QWERTY-style keyboard that is selectively provided on the display. The keyboard interface is displayed in response to the selection of a keyboard option from a menu and/or an icon when an input is provided. Therefore, when inputting data a user can select the keyboard interface through which text can be entered. With the Palm, after the user selects a key marked done on the keyboard, the keyboard is no longer displayed.

Other conventional handheld computing devices such as handheld computing devices manufactured by Hewlett Packard have included a pop-up user interface icon. A floating icon on the screen is touched. One such device is the HP Omni-Go device. Therefore, by user request, a device through software can provide a box which floats on the screen. However, a user was often confused because the placement of the small floating icon is difficult to predict on the screen.

Thus, there is a need for a dynamic user interface which can be removed or enlarged on the display/touch screen of a handheld computing device. Further, there is a need for an elegant way for engaging or activating a user interface area such as a keyboard or a graffiti area. Further, there is a need for a graffiti area that can be moved and can have multiple sizes.

SUMMARY

One embodiment relates to a mobile computing device comprising a housing; a touch screen display coupled to the housing; a processor coupled to the touch screen display; and a user input device responsive to a sliding manipulation by a user, the processor being configured to activate a keyboard entry area on the touch screen display responsive to the sliding manipulation, wherein the mobile computing device comprises a cellular phone.

Another embodiment relates to a mobile computing device comprising a housing; a touch screen display coupled to the housing; a processor coupled to the touch screen display; and a switch disposed in the housing, wherein the switch is operable to activate and deactivate an entry area on the touch screen display, the processor being configured to selectively provide the entry area at one of a plurality of different positions on the touch screen display based on an input from the switch.

Another embodiment relates to a mobile computing device comprising a housing; a touch screen display coupled to the housing; and a processor disposed within the housing and coupled to the touch screen display, wherein the processor is configured to provide an application area on the display, and wherein the processor is further configured to provide an entry area on the display and scroll the application area upward on the display in response to receiving an input triggering the display of the entry area.

BRIEF DESCRIPTION OF THE DRAWINGS

The present disclosure will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
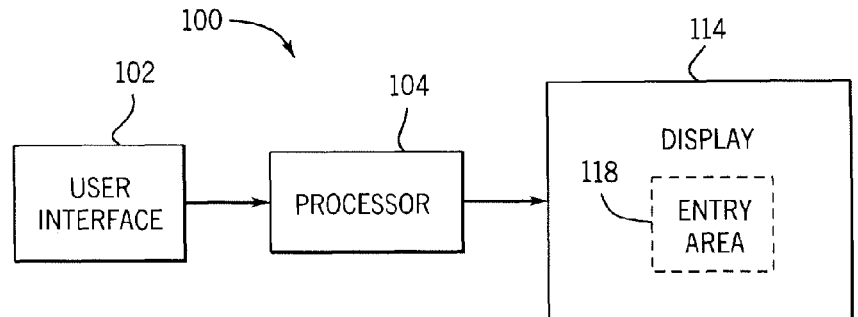
FIG. 1 is a schematic general block diagram of a handheld computer including a display and a touch screen, the display and the touch screen providing a text entry area that can be activated and deactivated in accordance with an exemplary embodiment.

Referring to FIG. 1, a handheld computer 100 is depicted according to an exemplary embodiment. Handheld computer 100 may include Palm style computers manufactured by Palm, Inc., of Santa Clara, Calif. Other exemplary embodiments may include Windows CE handheld computers, or other handheld computers and personal digital assistants, as well as mobile telephones, web access phones, pagers, and other mobile computing or communication devices. Computer 100 can include a user interface 102, a processor 104, and a display 114. User interface 103 provides data or commands to processor 104 which controls display 114. Interface 102 can include a switch 119, function keys 112, as well as a text entry area 118 provided on display 114 (see FIG. 3).

Computer 100 can include a user interface 102, a processor 104, and a display 114. User interface 102 provides data or commands to processor 104 which controls display 114. Interface 102 can include a switch 119, function keys 112 as well as a text entry area 118 provided on display 114 (see FIG. 3).

Preferably, handheld computer 100 includes interactive hardware and software that performs functions such as maintaining calendars, phone lists, task lists, note pads, calculator applications, spreadsheets, games, video files, and other applications capable of running on a computing device. Further, handheld computer 100 may be configured for such functions as voice memo recording and playback as well as communications network connectivity, Internet connectivity, wireless messaging, e-mail, always-on e-mail, and wireless telephony. In one embodiment, computer 100 includes at least the functionality of the PALM® M105, PALM® III, PALM® V, PALM® M505, PALM® M500, or PALM® VII series handled computing devices.

Figure 3:
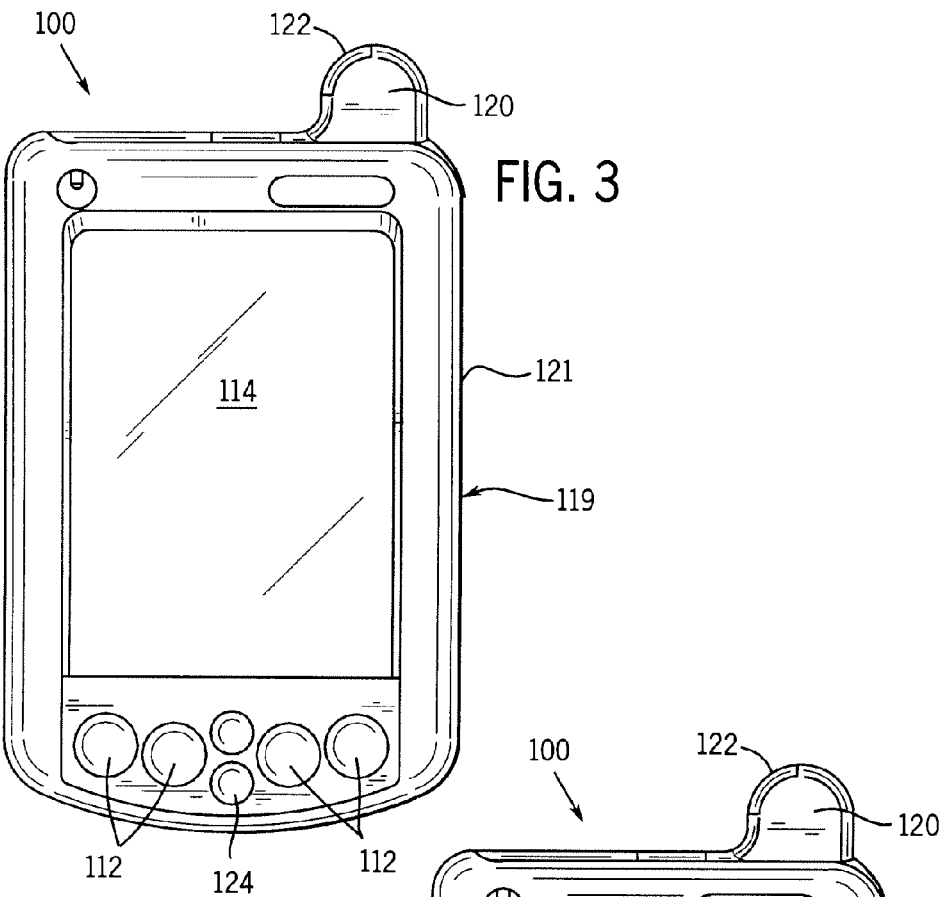
FIG. 3 is a schematic planar front elevation view of the handheld computer illustrated in FIG. 1, showing a display with a lateral pressure-sensitive switch for activating and deactivating the text entry area entry area activated.

Handheld computer 100, depicted in FIG. 3, includes a plurality of input function keys 112 and display 114 having graphical user interface features. Display 114 can be a monochrome or color LED display or OLED display. Display 114 may be provided with a touch screen interface that allows a user to select and alter displayed content using a pointer, such as but not limited to a stylus, a pen tip, a fingertip, or other pointing devices.

Referring to FIGS. 1 and 3, in an exemplary embodiment, display 114 also includes a data entry area, such as, area 118 for tracing alpha-numeric characters as input. Area 118 can be a Graffiti text entry (or other handwriting recognition software) area optionally including a first portion for entering letters (text) and a second portion for entering numbers (text).

Figure 4:
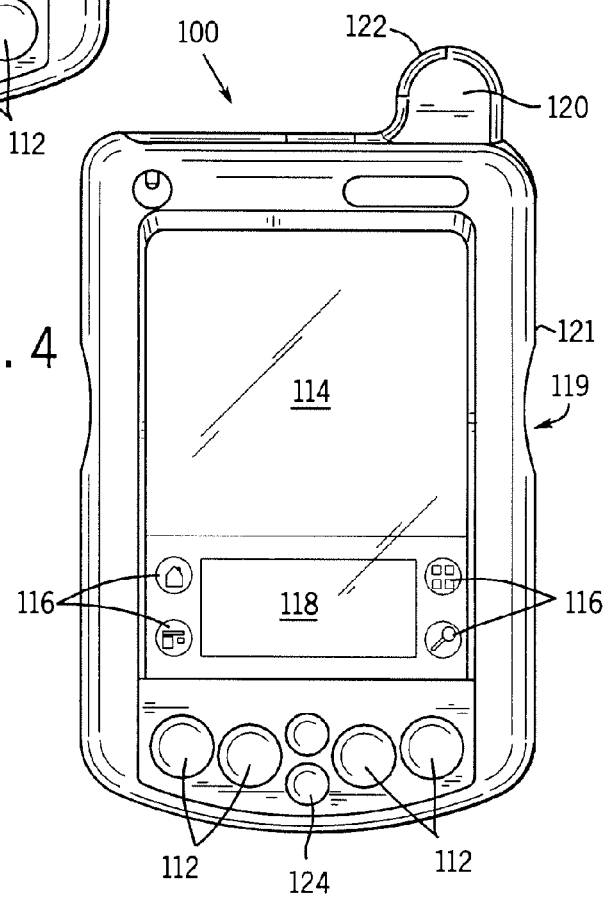
FIG. 4 is a schematic planar front elevation view of the handheld computer illustrated in FIG. 3 showing an activated text entry area.

A plurality of input icons 116 for performing automated or preprogrammed functions may be provided on a portion of display 114 (see, e.g., FIG. 4). Display 114 can also include a text entry area, such as a keyboard provided on display 114 designating areas of the touch screen interface for particular letters. The keyboard can be accessible via switch 119 discussed below or through a menu or icon activated command.

In an exemplary embodiment, handheld computer 100 may include an integrated antenna 120 (FIG. 3) configured to transmit and receive wireless communication signals, such as, but not limited to, cellular telephone communication signals and other radio frequency (RF) communications signals using an RF transceiver. Antenna 120 may further include an indicator light 122 integrated into antenna 120 for indicating the transmission and reception of wireless communication signals. Further, light 122 may be used to indicate other states of handheld computer 100.

In an exemplary embodiment, handheld computer 100 also includes navigation buttons 124 that may be utilized for navigating or scrolling of information displayed on display 114. Further, navigation buttons 124 may be programmed for other uses depending on the application running on handheld computer 100. Handheld computer 100 may be used for any of a variety of wireless communications, including, but not limited to, communications with the World Wide Web, mobile telephone communications, e-mail communications, etc.

Advantageously, handheld computer 100 includes a switch 119 for activating and deactivating a text entry area such as entry area 118. Switch 119 can be a variety of devices for indicating whether entry area 118 should be activated or deactivated. For example, switch 119 can be a pressure activated switch or sensor, a push button, a mechanical switch, a sliding switch, a space bar type switch, a capacitive sensor, or other manipulatable device.

Computer 100 can be designed to operate in a toggle mode in which switch 119 is pressed or engaged to cause entry area 118 to appear on display 114. Display 114 continues to display entry area 118 until switch 119 is engaged again or another switch is manipulated.

The toggle mode is particularly advantageous for users who only have one hand free, are disabled, or otherwise cannot engage switch 119 while entering data into writing section 118. Alternatively, entry area 118 can be made to disappear by touching a box, or other symbol in the writing area. In another embodiment, computer 100 operates in a non-toggle mode in which entry area 118 is continuously displayed as switch 119 is engaged. Once switch 119 is no longer engaged, entry area 118 is removed from display 114. In the non-toggle mode, ergonomic efficiency is enhanced as area 118 pops-up in response to switch 119 being engaged when the user picks up computer 100 is in a writing position.

Preferably, computer 100 includes software for causing entry area 118 to be activated or deactivated in response to the manipulations of switch 119. Preferably, switch 119 is a pressure activated sensor or switch located on a side housing of handheld computer 100.

Figure 2:
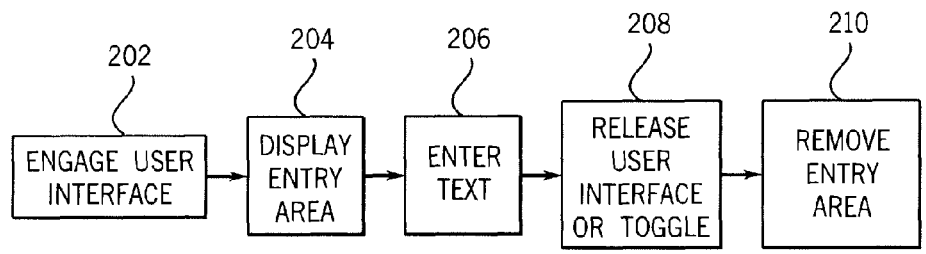
FIG. 2 is a flow diagram representative of the operation of the handheld computer illustrated in FIG. 1.

With reference to FIGS. 1 and 2, operation of system 100 is described below. At a step 200, a user engages a portion of user interface 102 such as switch 119 to begin entry of text in area 118. When switch 118 of user interface 102 is engaged, entry area 118 is displayed on display 114 at step 204. Entry area 118 can be displayed in a variety of sizes and a variety of locations. For example, display 118 can be provided as a keyboard, or a graffiti area at a bottom or top of display 114. In another example, display 204 can cause an application area of display 114 to scroll up as entry area 118 is displayed on bottom of display 114. Entry area 118 can appear in a pop-up effect or be scrolled from a top, side or bottom.

At a step 206, text such as letters or numbers or symbols can be entered on area 118. After the user enters text in step 206, the user can release switch 119 or at a step 208 to cause entry area to be removed from display at a step 210. Alternatively, the user can manipulate switch 119 again to cause entry area 118 to be removed or touch another portion of user interface 118.

With reference to FIGS. 3-9, various embodiments are shown including switch 119 of various shapes and sizes and entry area 118 of various sizes and placements on display 114. Further, switch 119 can be placed at various locations on computer 100. The embodiment shown in FIGS. 3-9 can be combined with each other without departing from the scope of the invention. Although shown as examples, the embodiments of FIGS. 3-9 are examples only and are not by any means the only examples of writing areas 118 and switches 119.

With reference to FIGS. 3 and 4, handheld computer 100 is shown with switch 119 disengaged (FIG. 3) and with switch 119 engaged (FIG. 4). In FIG. 3, switch 119 is a pressure sensitive switch located on at least one lateral side 121 of computer 100. The use of switch 119 allows the user to immediately engage entry area 119 without having to look for an icon on display 114.

With reference to FIG. 4, when lateral side 121 is deformed due to pressure provided by user, entry area 118 is displayed upon a bottom portion of display 114. In another embodiment, lateral side 121 is not deformed in response to pressure, however switch 118 senses pressure. One example of a pressure sensitive switch can be a substantive deformation of lateral side 121. Computer 100 can be configured to sense the application of a squeezing motion by the user.

Handheld computer 100 in FIGS. 3 and 4 is preferably operative in non-toggle mode in which area 118 is only displayed as switch 118 is engaged or senses pressure. In this way, when computer 100 is held and squeezed by a user in one hand, entry area 118 is provided which allows text to be entered by the other hand of the user. Such an elegant approach allows the user to engage and disengage the entry area 118 in response to natural motions associated with picking up handheld computer 100 and writing or pressing keys.

Figure 5:
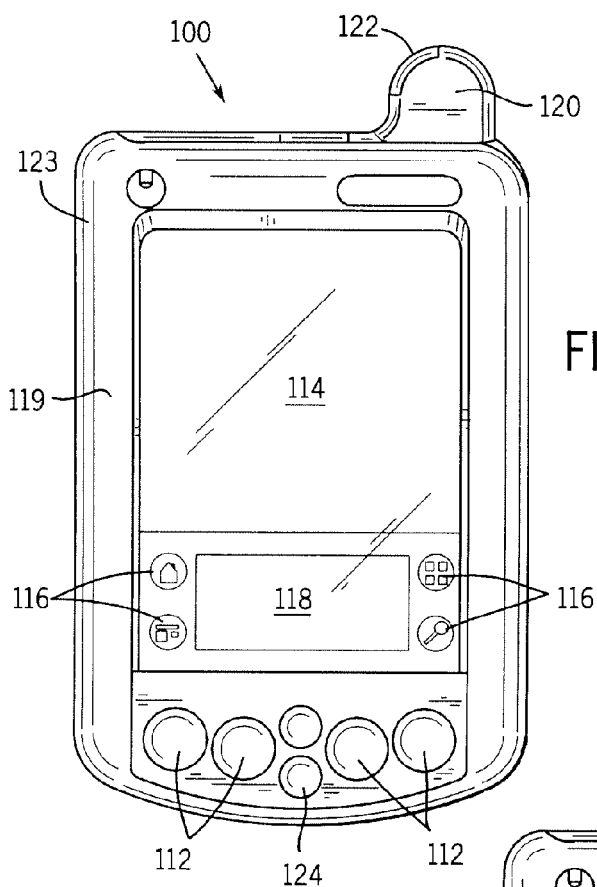
FIG. 5 is a schematic planar front elevation view of the handheld computer illustrated in FIG. 1 with an elongated switch for activating and deactivating the text entry area, in accordance with another exemplary embodiment.

With reference to FIG. 5, handheld computer 100 includes switch 119 embodied as a spacebar switch or elongated switch on a side 123 handheld computer 100. Alternatively, switch 119 can be provided on a bottom surface or a lateral surface of handheld computer 100.

In this embodiment, computer 100 can operate in a toggled or non-toggled mode. In the toggled mode, when switch 119 is pressed such as by the thumb of the user as computer 100 is held, entry area 118 is displayed on screen 114. When switch 119 is released or disengaged, entry area 118 disappears. In a toggled-mode, when switch 119 is pressed once, entry area 118 is displayed until switch 119 is pressed again. Computer 100 can be configured for use in the toggle or non-toggle mode.

Figure 6:
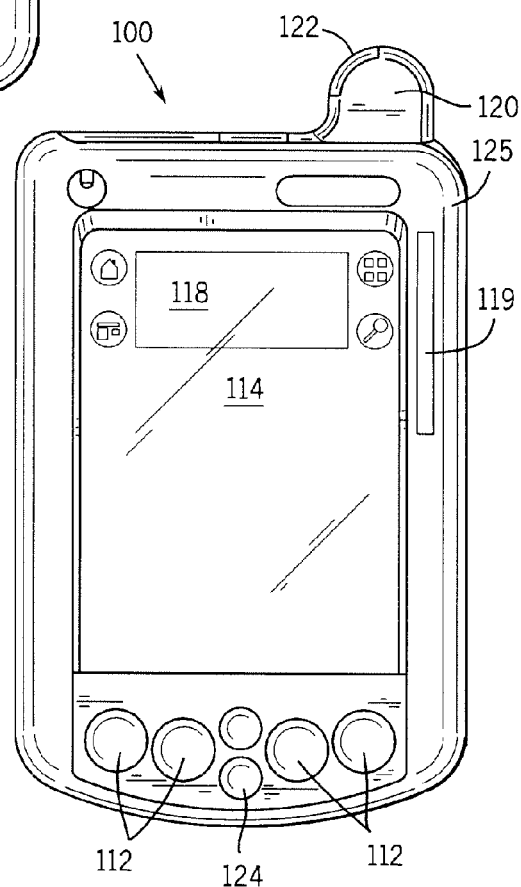
FIG. 6 is a schematic planar front elevation view of the handheld computer illustrated in FIG. 1 with a switch for activating and deactivating the text entry area, the text entry area occupying a top portion of the display and touch screen in accordance with another exemplary embodiment, showing a user interface.

With reference to FIG. 6, handheld computer 100 includes a switch 119 which is provided on a side 125 of computer 100. Switch 118 in FIG. 6 is not quite as elongated as in FIG. 5. In addition, handheld computer 100 is configured so that entry area 118 is provided on a top portion of display 114, rather than on a bottom portion as shown in FIGS. 1-5.

Alternatively, entry area 118 can be provided on a middle portion of display 114 or a side portion of display 114. In one embodiment, the location of entry area 118 can be configured through a menu selection or by dragging area 118 to a desired location.

Figure 7:
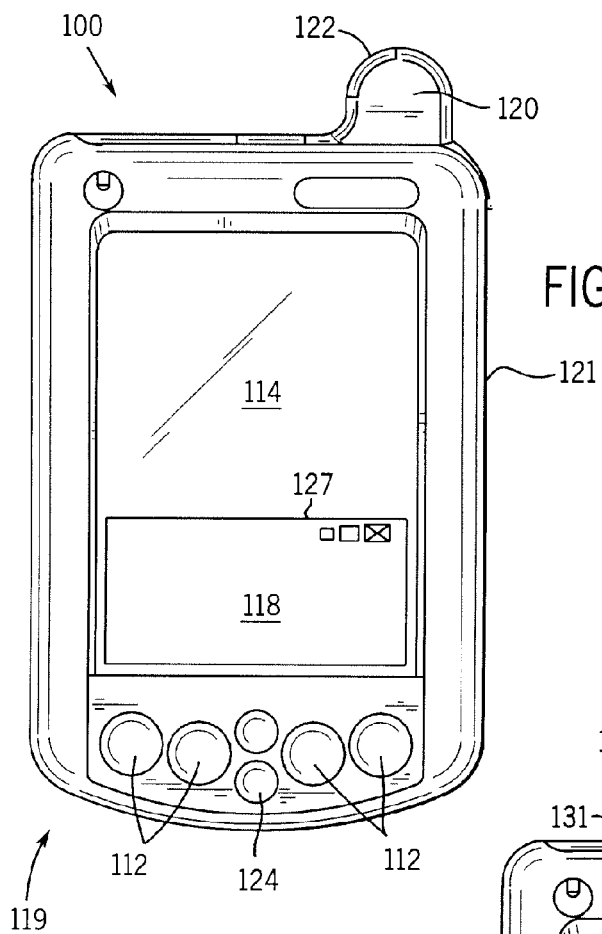
FIG. 7 is a schematic planar front elevation view of the handheld computer illustrated in accordance with yet another exemplary embodiment, with a switch for activating the text entry area, the text entry area being of variable sizes, wherein the interface area is provided at a top of the screen.

With reference to FIG. 7, handheld computer 100 utilizes any of buttons 112, 120 or 124 to provide entry area 118. In this embodiment, buttons 112 or 124 operate as switch 119. Further, in FIG. 7, handheld computer 100 includes an enlarged entry area 118 which does not include icons such as icons 116 shown in FIGS. 1-6. Preferably, entry area 118 includes icons such as boxes 127 provided on screen 114 to indicate the size of entry area 118. For example, in FIG. 7, two sizes are selectable, such as a size associated with entry area 118 in FIG. 6 and a size associated with entry area 118 in FIG. 7. A third box can be utilized to make entry area 118 disappear.

Figure 9:
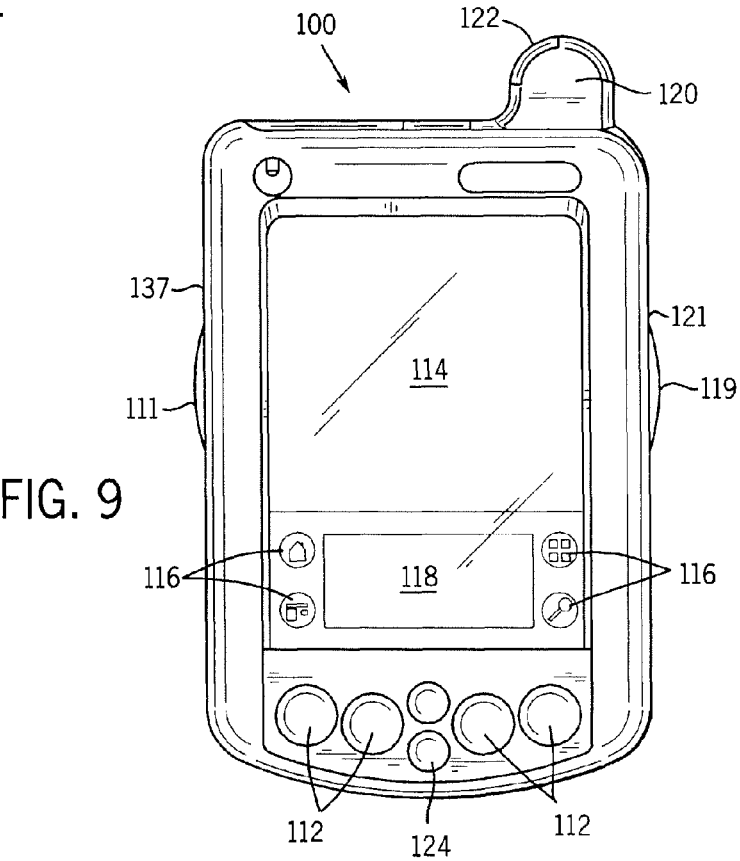
FIG. 9 is a planar front elevation view of a handheld computer illustrated in FIG. 1 with a switch on lateral sides of the computer, the switch being for activation and deactivation of the text entry area, in accordance with still another exemplary embodiment.
Figure 8:
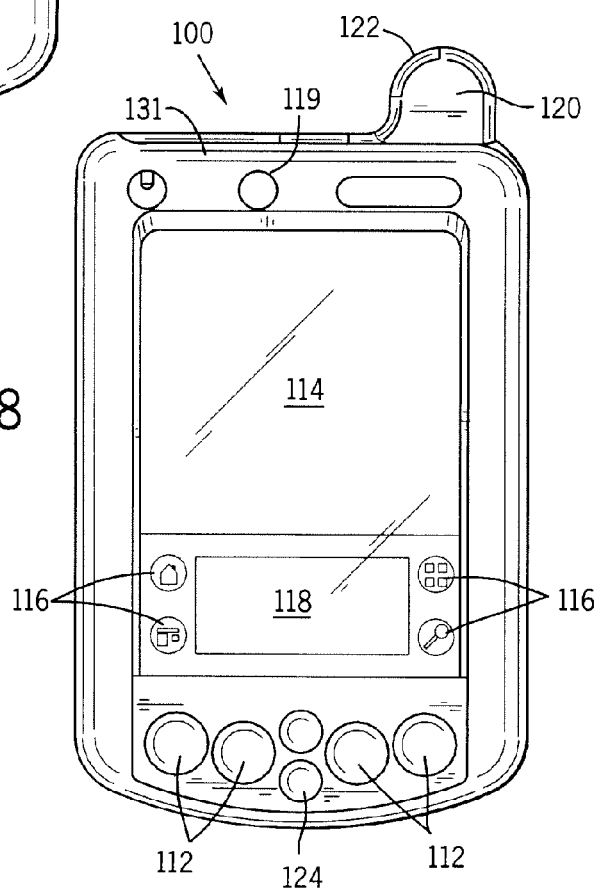
FIG. 8 is a schematic planar front elevation view of the handheld computer illustrated in FIG. 1 with a circular switch for activating and deactivating the text entry area in accordance with yet another exemplary embodiment, wherein the interface area is provided in multiple sizes.

With reference to FIG. 8, handheld computer 100 includes a circular push button switch 119 located at a top portion 131 of computer 100. With reference to FIG. 9, switch 119 extends from a lateral side 121 and 137. In FIG. 9, switch 119 can be a slidable switch, or a deformable push switch or a pressure sensor. Computer 100 in FIG. 9 can operate in a toggle or non-toggle mode.

While the detailed drawings, specific examples and particular formulations given describe preferred and exemplary embodiments, they serve the purpose of illustration only. The disclosure is not limited to the specific forms shown. For example, the methods may be performed in any of a variety of sequence of steps. The hardware and software configurations shown an described may differ depending on the chosen performance characteristics and physical characteristics of the computing devices. For example, the type of computing device, communication bus, or processor used may differ. The systems methods depicted and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is claimed is:

1. A mobile computing device comprising:
    a housing;
    a touch screen display coupled to the housing;
    a processor coupled to the touch screen display; and
    a user input device that is separate from the touch screen display, responsive to a sliding manipulation by a user and disposed in the housing;
    wherein the user input device is operable to activate and deactivate an entry area on the touch screen display based on the sliding manipulation by the user, the processor configured to provide the entry area at one of a plurality of different positions on the touch screen display based on an input from the user input device that is based on the sliding manipulation by the user; and
    wherein the entry area appears when the entry area is activated and disappears when the entry area is deactivated.

2. The mobile computing device of claim 1, wherein the processor is configured to run electronic calendar and phone list applications.

3. The mobile computing device of claim 1, wherein the processor is configured to provide a keyboard entry area in one of a plurality of different sizes.

4. The mobile computing device of claim 1, wherein the user input device is a sliding switch.

5. The mobile computing device of claim 1, further comprising at least one input button provided below the touch screen display.

6. The mobile computing device of claim 1, wherein the mobile computing device is a handheld computing device.

7. A mobile computing device comprising:
    a housing;
    a touch screen display coupled to the housing;
    a processor coupled to the touch screen display; and
    a switch disposed in the housing that is separate from the touch screen display;
    wherein the switch is operable to activate and deactivate an entry area on the touch screen display, the processor configured to selectively provide the entry area at one of a plurality of different positions on the touch screen display based on an input from the switch; and
    wherein the processor is configured to selectively provide the entry area to one of a top, a bottom, and a side of the display.

8. The mobile computing device of claim 7, wherein the entry area comprises a keyboard entry area.

9. The mobile computing device of claim 7, wherein the mobile computing device is configured to provide cellular telephone and email communications.

10. The mobile computing device of claim 7, wherein the switch is responsive to a sliding manipulation by a user.

11. The mobile computing device of claim 7, wherein the entry area is a text entry area.

12. The mobile computing device of claim 7, wherein the mobile computing device is a handheld computing device.

13. A mobile computing device comprising:
    a housing;
    a touch screen display coupled to the housing;
    a switch disposed in the housing that is separate from the touch screen display; and
    a processor disposed within the housing and coupled to the touch screen display;
    wherein the processor is configured to provide an application area on the display, and wherein the processor is further configured to provide an entry area on the display and scroll the application area upward on the display in response to receiving an input from the switch triggering the display of the entry area; and
    wherein the processor is configured to selectively provide the entry area to one of a top, a bottom, and a side of the display.

14. The mobile computing device of claim 13, wherein the entry area is provided in the display in a pop-up manner.

15. The mobile computing device of claim 13, wherein the processor is configured to run electronic calendar and email applications.

16. The mobile computing device of claim 13, wherein the mobile computing device comprises a cellular phone.

17. The mobile computing device of claim 13, wherein the mobile computing device is a handheld computing device.

* * * * *